United States Patent

Owada et al.

[11] Patent Number: 5,825,931
[45] Date of Patent: Oct. 20, 1998

[54] IMAGE ENCODING DEVICE

[75] Inventors: Mitsuru Owada, Yokohama; Yushi Kaneko, Kawasaki, both of Japan

[73] Assignee: Canon Kabushiki Kaisha, Tokyo, Japan

[21] Appl. No.: 962,649

[22] Filed: Nov. 3, 1997

Related U.S. Application Data

[63] Continuation of Ser. No. 609,001, Feb. 29, 1996, abandoned, which is a continuation of Ser. No. 87,070, Jul. 7, 1993, abandoned.

[30] Foreign Application Priority Data

Jul. 14, 1992 [JP] Japan .................................... 4-187073

[51] Int. Cl.$^6$ ...................................................... G06K 9/36
[52] U.S. Cl. .......................... 382/236; 382/248; 348/399; 348/416
[58] Field of Search ................................. 382/232, 236, 382/248; 348/399, 416

[56] References Cited

U.S. PATENT DOCUMENTS

| 4,651,206 | 3/1987 | Ohki | 358/136 |
|---|---|---|---|
| 4,689,671 | 8/1987 | Ohki et al. | 348/416 |
| 4,831,439 | 5/1989 | Fedele et al. | 358/133 |
| 4,888,640 | 12/1989 | Acampora et al. | 358/133 |
| 4,924,311 | 5/1990 | Ohki et al. | 358/138 |
| 5,040,061 | 8/1991 | Yonemitsu | 348/401 |
| 5,057,916 | 10/1991 | Krause et al. | 358/105 |
| 5,103,488 | 4/1992 | Gemello et al. | 382/22 |
| 5,132,792 | 7/1992 | Yonemitsu et al. | 348/416 |
| 5,140,437 | 8/1992 | Yonemitsu et al. | 348/416 |
| 5,260,783 | 11/1993 | Dixit | 348/415 |
| 5,311,310 | 5/1994 | Jozawa et a. | 348/416 |

FOREIGN PATENT DOCUMENTS

| 0434427 | 6/1991 | European Pat. Off. . |
|---|---|---|
| 4025756 | 2/1991 | Germany . |

*Primary Examiner*—Christopher S. Kelley
*Attorney, Agent, or Firm*—Fitzpatrick, Cella, Harper & Scinto

[57] ABSTRACT

The disclosure presents an image encoding device which changes a position of a partial area in which there are pixels encoded by using only pixels in the present picture at intervals, or an image encoding device which decides the partial area such that the partial area is a continuous area in a picture. Accordingly, the device efficiently prevents to spread errors, can avoid frequent deteriorations of images, and can improve a quality of encoded images.

22 Claims, 4 Drawing Sheets

IMAGE ENCODING DEVICE

This application is a continuation of application Ser. No. 609,001, field Feb. 29, 1996, which is a continuation of application Ser. No. filed 08/087,070, filed Jul. 7, 1993, both now abandoned.

FIELD OF THE INVENTION

This invention relates to an image encoding device, and, more particulary, to an encoding device which uses a correlation between adjacent pictures (frames or fields) of a video signal.

DESCRIPTION OF THE RELATED ART

Many systems for encoding digital image information to compress an amount thereof have been proposed in the past. One of the proposed systems is a so-called an intra-frame (or field) encoding system and another is a so-called a inter-frame (or field) encoding system.

The intra-frame encoding system is a system which compresses the amount of the data by using characteristics of the image that adjacent pixels usually have a similar brightness and a similar color. Actual images usually have the major portions which have continuous similar brightness and similar colors. Therefore, it is possible that the compression of one fifth or one tenth is easily executed by using the intraframe encoding system.

The inter-frame encoding system is a system which encodes mainly compensative information by using similarities between adjacent pictures (frame or field).

Patterns of adjacent pictures are usually similar except for some movements and modifications. By using this characteristic, the inter-frame encoding system calculates relational information indicating relationships between adjacent pictures. For instance, the relational information includes information which indicates a motion of the image, a modification of color information, and a modification of luminance information. "Predictive values" are calculated on the basis of the relational information. In other words, information indicating the most similar images to the image to be encoded are calculated by using information of neighboring pictures.

Then, only information indicating differences between "predictive values" and values of the image to be encoded are encoded.

For instance, in the case when a person moves to the right in a motion picture in which there is only the person and a background, "predictive values" for a part of the person in the present picture are formed by values of a part of the person in the preceding picture. The relational information is also encoded together with differential values between the "predictive values" and values of the image to be encoded.

When information is compressed by a prior art device using a inter-frame encoding system, errors are spread in a direction of time when errors occur. Therefore the prior art device normally encodes one picture by using an intra-frame encoding system after a predetermined number of pictures have been encoded by using the inter-frame encoding system. In short, the intra-frame encoding for one picture and the inter-frame encoding for several pictures are alternatively executed. In that case, such intra-frame encoding is called "refresh operation".

Typically, the amount of data encoded by the intra-frame encoding is about 16–25 k bytes per frame, and the amount of data encoded by the inter-frame encoding is about 7–10 k bytes per frame. In short, it is known that the amount of data encoded by the intra-frame encoding is more than that encoded by the inter-frame encoding.

Therefore, when the intra-frame encoding is executed at regular intervals by using a quantizing step which was previously used by the inter-frame encoding, the amount of data suddenly increases at the intervals. Therefore, it is difficult to maintain a uniform transmitting rate and a significant amount of memory must be provided for this purpose. On the other hand, when the quantizing step is varied to obtain a uniform transmitting rate, there is another problem that the quality of images is frequently degraded. In general, the above mentioned problems occur in the encoding device which uses a correlation between adjacent pictures of the video signal.

SUMMARY OF THE INVENTION

The present invention has been made in consideration of the above-mentioned problems. An object of the invention is to provide an image encoding device which can solve the problems.

Another object of the invention is to provide an image encoding device which can reduce an amount of the data by using the correlation between adjacent pictures and which can maintain a uniform transmitting rate.

To achieve such objects, the present invention provides the image encoding device which changes a position of a partial area in which there are pixels encoded by using only pixels in the present picture, at intervals.

Further, to achieve above-mentioned objects, the present invention provides an image encoding device which decides a partial area in which there are pixels encoded by using only pixels in the present picture, such that the partial area is a continuous area in a picture.

Other objects and features of the present invention will be apparent from the following description taken in conjunction with the accompanying drawings.

DETAILED DESCRIPTION OF THE EXEMPLARY EMBODIMENTS

An encoding device relating to the present invention is explained by the following.

Figure 1:
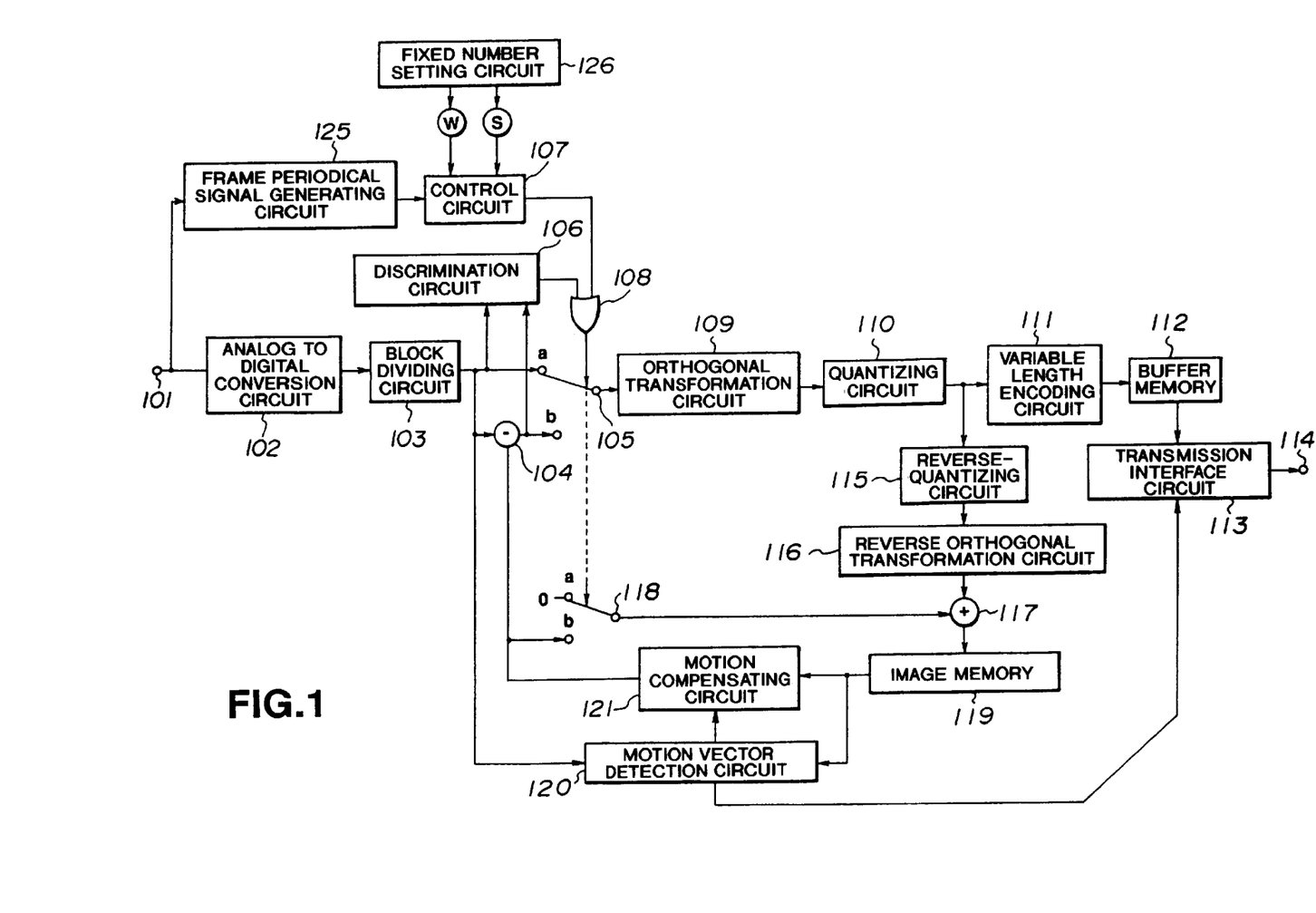
FIG. 1 is a block diagram which shows an image encoding device according to an embodiment of the present invention.

FIG. 1 is a block diagram which shows an encoding device as an embodiment of the present invention.

In FIG. 1, 101 shows an input terminal which receives an image signal. The image signal is an analog motion video signal like a television signal. 102 shows an analog-to-digital (A/D) conversion circuit for converting the analog video signal to a digital video signal. 103 shows a block dividing circuit for changing the order of pixels included in the digital video signal and for dividing the pixels into a plurality of blocks, each of which is composed of a plurality of pixels. 104 shows a subtracting circuit which calculates a difference, between a video signal of a present frame and a predictive video signal. 105 shows a switching circuit which selectively outputs a signal output from the block dividing circuit 103 and a signal output from the subtracting circuit.

106 shows a discrimination circuit which compares an efficiency of encoding the video signal of the present frame with an efficiency of encoding the predictive video signal to select one of them as a signal to be encoded.

107 shows a control circuit for a refresh operation to which a frame periodical signal generated by a frame periodical signal generating circuit 125 and fixed number data W and S set by a fixed number setting circuit 126 are supplied. The operations of the control circuit 107 are explained in detail below.

108 shows an OR circuit to which a discrimination result from the discrimination circuit 106 and a refresh control signal from the control circuit 107 are supplied. 109 shows an orthogonal transformation circuit for orthogonally transforming a signal selected by the switching circuit 105. 110 shows a quantizing circuit for quantizing orthogonally transformed coefficients. 111 shows a variable length encoding circuit for encoding quantized coefficients using a well-known variable length encoding circuit. 112 shows a buffer memory for controlling a quantity of data to be transmitted in a unit time. 113 shows a transmission interface circuit which forms a transmission format to transmit data, and 114 shows an output terminal for outputting the data.

115 shows a reverse-quantizing circuit which executes a reverse operation to the quantizing circuit 110. 116 shows a reverse orthogonal transformation circuit which executes a reverse operation to the orthogonal transformation circuit 109. 117 shows an adding circuit to produce a local decoded signal. 118 shows a switching circuit which selects either a terminal (a) or a terminal (b) in response to an output of the OR circuit 108, and connects with the switching circuit 105.

119 shows an image memory for temporarily storing the local decoded signal, as a reproduced signal, of the present frame and for outputting a local decoded signal of a preceding frame. 120 shows a motion vector detection circuit for calculating a motion vector by comparing the signal of the present frame and the local decoded signal of the preceding frame. 121 shows a motion compensating circuit for modifying the local decoded signal of the preceding frame to compensate a motion of the images on the basis of the motion vector produced by the motion vector detection circuit 120.

Operations of the encoding device having a structure mentioned above are explained by the following.

The analog video signal input from the input terminal 101 is converted to the digital video signal by the A/D conversion circuit 102. The order of pixels in the digital video signal is changed, and the pixels in the digital video signals are divided in the plurality of blocks, each of which has i pixels in a horizontal direction and j lines in a vertical direction, by the block, dividing circuit 103. For instance, each block comprises (8×8) pixels when i=j=8.

The signal produced in such a way by the block dividing circuit 103 is supplied to the subtracting circuit 104, terminal (a) of the switching circuit 105 and the discrimination circuit 106.

On the other hand, the predictive signal formed by modifying the local decoded signal of the preceding frame in the motion compensating circuit 121 is also supplied to the subtracting circuit 104. The subtracting circuit 104 calculates difference values between the predictive signal output from the motion compensating circuit and the signal of the present frame processed through the block dividing circuit 103, and supplies the difference values to terminal (b) of the switching circuit 105 and the discrimination circuit as a difference signal.

The discrimination circuit 106 compares efficiencies for encoding the signal of the present frame and the predictive signal, and outputs a discriminating result which indicates which signal is better for encoding. In short, the discrimination circuit 106 selects the encoding system between the intra-frame encoding and the inter-frame encoding systems. The discrimination result controls the switching circuit 105 and the switching circuit 118 through the OR circuit 108, such that the terminal (a) connects to a common terminal when the efficiency for encoding the signal of the present frame is better than that for encoding the predictive signal, and the terminal (b) connects to the common terminal when the efficiency for encoding the predictive signal is better than that for encoding the signal of the present frame.

On the other hand, a control signal for forcibly setting the intra-frame encoding system to periodically execute the refresh operation is produced by the control circuit 107 and is supplied to another input of the OR circuit 108. The purpose of the refresh operation is to inhibit a spread of errors in a time-based direction while errors are occurring. The detailed operations of the control circuit are explained below.

The selected signal output from the switching circuit 105 is supplied to the orthogonal transformation circuit 109. In the present embodiment, Discrete Cosine Transform (DCT) is used as a system having a high transforming efficiency and being readily realized in hardware. The orthogonal transformation circuit 109 outputs the orthogonal transformed coefficients and the coefficients are supplied to the quantizing circuit 110.

The quantizing circuit 110 quantizes the coefficients according to characteristics which are related to human visual characteristics and so on. The quantized coefficients output from the quantizing circuit 110 are supplied to the variable length encoding circuit 111 and the reverse-quantizing circuit 115.

The variable length encoding circuit 111 first changes the order of the quantized coefficients in order to heighten the efficiency of encoding the quantized coefficients in consideration of distributions of the quantized coefficients depending on characteristics of images. After that, the circuit 111 executes variable length encoding, details of which are selected such that the highest efficiency is obtained according to the distributions.

An encoded signal output from the variable length encoding circuit 111 is input to the buffer memory 112. The buffer memory 112 regulates a quantity of data to be output in the unit time, although a quantity of data output from the variable encoding circuit 111 in the unit time varies. In short, a quantity of data in each frame may be varied, so that the memory 112 controls a quantity of data in a unit period of time which is much longer than a period of time for one frame.

Output data from the buffer memory 112 is supplied to the transmission interface circuit 113. The transmission interface circuit 113 outputs a transmissible video signal synchronized with a transmitting clock. The transmissible video signal is composed of the image data read from the buffer memory 112, synchronizing data and error correction codes produced in the circuit 113, and motion vector data provided by the motion vector detection circuit 120, according to a predetermined transmitting format. Such transmissible video signal is supplied to transmitting path through the output terminal 114.

On the other hand, the quantized coefficients supplied to the reverse-quantizing circuit 115 are processed by a characteristic reverse to that of the quantizing circuit 110. In short, the reverse-quantizing circuit 115 outputs similar coefficients to orthogonally transformed coefficients to be supplied to the quantizing circuit. Specifically, the circuit 115 outputs representative coefficients each of which represents coefficients included in each quantizing step. Such representative coefficients are supplied to the reverse orthogonal transformation circuit 116, and are processed by a characteristic reverse to the orthogonally transformation circuit 109. Therefore, the reverse orthogonal transformation circuit 116 outputs a similar signal to the signal to be supplied to the orthogonal transformation circuit 109.

Such reverse orthogonally transformed signal and a signal output from the switching circuit 118 are supplied to the adding circuit 117. While the switching circuit 118 is connecting a common terminal thereof to the terminal (a), the switching circuit 105 is also connecting the common terminal thereof to the terminal (a) and the intra-frame encoding system is being executed. In other words, the signal of the present frame is being encoded and decoded without the above-mentioned subtraction and a decoded signal is being supplied to the adding circuit 117. In this case, an output signal of the adding circuit 117 is identical with an input signal thereof and is similar to the signal output from the block dividing circuit 103.

While the switching circuit 118 is connecting the common terminal thereof to the terminal (b), the switching circuit 105 is outputting a difference signal output from the subtracting circuit 104 and a signal similar to the difference signal is being supplied to the adding circuit 117. The difference signal is produced by subtracting the predictive video signal produced by the motion compensating circuit 121, as mentioned above.

The predictive video signal is also supplied to the terminal (b) of the switching circuit 118. Therefore, the output signal of the adding circuit 117 is also similar to the signal output from the block dividing circuit 103 while the inter-frame encoding system is being executed. The image memory 119 delays the local decoded signal produced by the adding circuit 117 about one frame period of time and outputs the video signal of the preceding frame.

The motion vector detection circuit 120 receives the video signal of the preceding frame output from the image memory 119 and the video signal of the present frame output from the block dividing circuit 103, and compare them to calculate a moving direction and a moving extent of the block. The motion vector which indicates the moving direction and the moving extent is supplied to the motion compensating circuit 121. Many methods for calculating such motion vector have already been proposed and are well-known. Therefore, detailed explanations of calculating the motion vector are omitted.

The motion compensating circuit 121 produces an ideal predictive video signal which is as similar as possible to the video signal of the present frame by adjusting output timing and order of the video signal of the preceding frame on the basis of the motion vector. Further, such motion compensating process is also well-known and has been proposed. Therefore, detailed explanations of motion compensating are also omitted.

Control operations of the control circuit 107 are described by the following.

Figure 2:
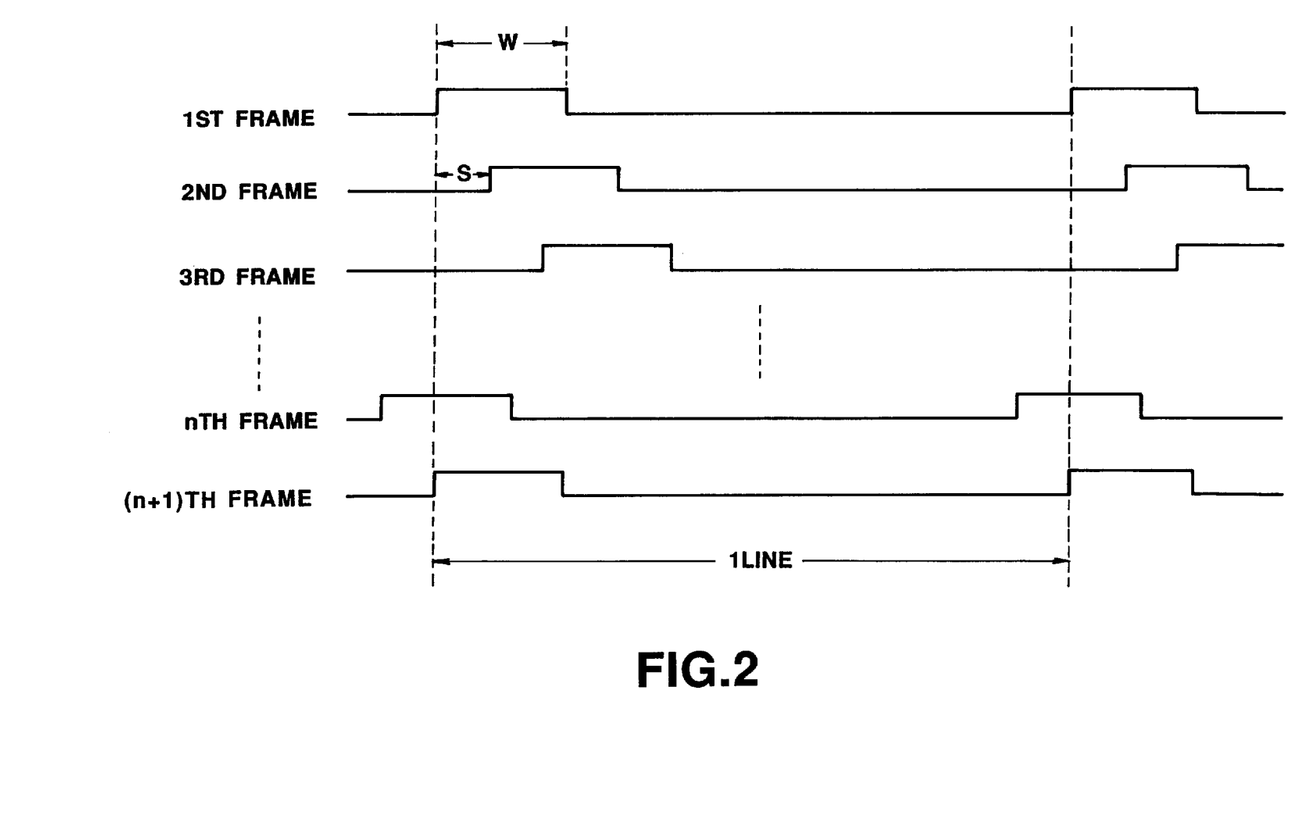
FIG. 2 shows a waveform output from a control circuit shown in FIG. 1.

FIG. 2 shows waveforms of the signal output from the control circuit 107 and relations between the waveforms and fixed number data W and S.

The control signal has "1" level (high level) during a period which has a length of time corresponding to the data W in a certain first frame. The "1" level causes the encoding device to execute the refresh operation. Accordingly, hereinafter the period when the control signal is "1" is called a refresh period.

Outside the refresh period, the control signal has "0" level (low level) and the encoding device executes a normal operation, in short, encodes a video signal by using a selected proper encoding system between the intra- and the inter-frame encoding systems.

The refresh period comes repeatedly every line period, as shown in FIG. 2. Therefore, parts of lines corresponding to the "1" level occupy a strip-shaped area which has a width corresponding to the data W and spreads in a vertical direction on a picture. Hereinafter, the strip-shaped area is called a refresh area. The pixels in the refresh area are processed by the refresh operation.

In a second frame, the refresh period is delayed from that in the first frame by a period corresponding to the data S, as shown in FIG. 2. On a picture, the refresh area is shifted by a distance corresponding to the fixed number data S in a horizontal direction.

After a third frame, the refresh period is delayed by the period corresponding to the data S every period of one frame, and the refresh area is shifted by the distance corresponding to the data S every period of one frame. In the present embodiment, the data S is set such that the period corresponding to the data S is one n-th, n being an integer. Therefore, the refresh period returns an initial position every n frames.

Figure 3A:
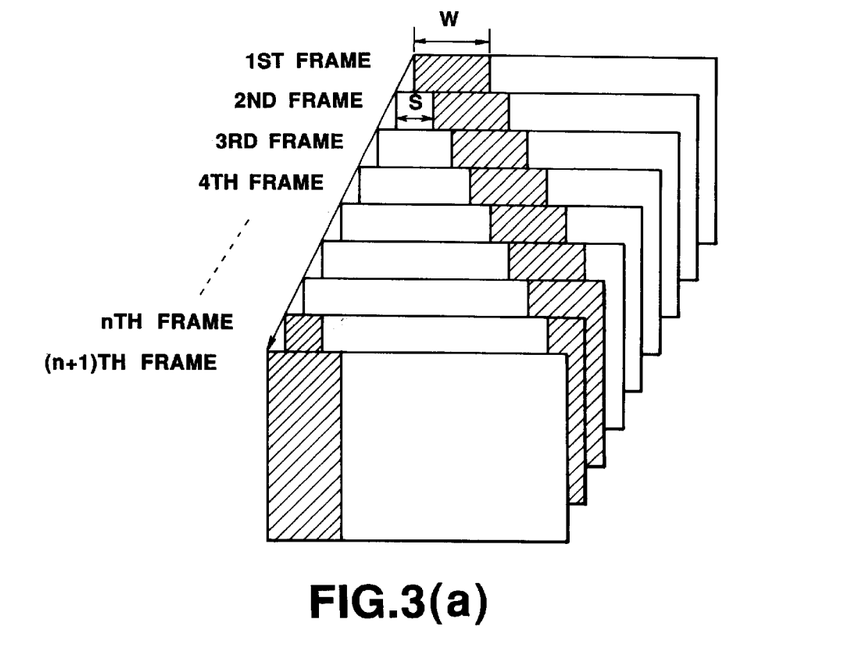
FIGS. 3(a) and 3(b) show examples of a refresh operation of the encoding device shown in FIG. 1.

The control circuit 107 outputs the refresh control signal, as shown in FIG. 2. FIG. 3 (a) shows the refresh areas according to the refresh periods shown in FIG. 2 on the picture in continuous frames.

Figure 3B:
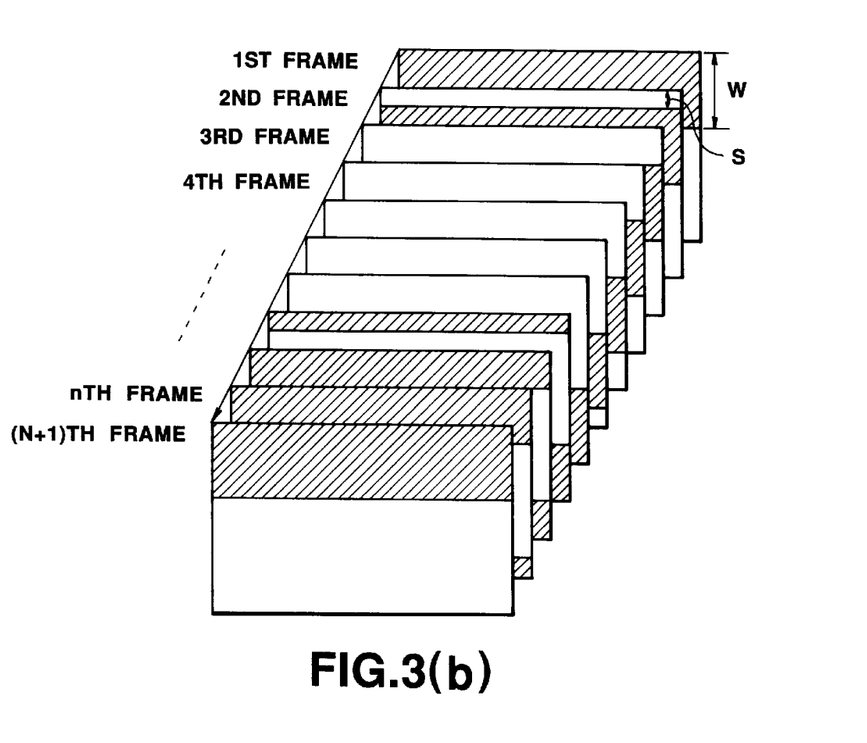

FIG. 3 (b) shows another example of the refresh areas which are strip-like areas spreading in a horizontal direction and which have a width corresponding to the data W. In this case, the refresh area is shifted by a distance corresponding to the data S in a vertical direction.

The encoding device shifting the refresh area every period of frame, as mentioned above, can refresh a whole area of the image, with a relatively uniform quantity of data for transmission or storage in each frame. And the encoding device making the refresh area occupy a continuous area can execute a good motion compensating operation, because the motion compensating operations are performed in a remaining area, which is also continuous and are accurately performed by an extent between adjacent pixels as a unit.

The ideal conditions for the data W and the data S are considered by referring to FIG. 4 as follows.

Figure 4:
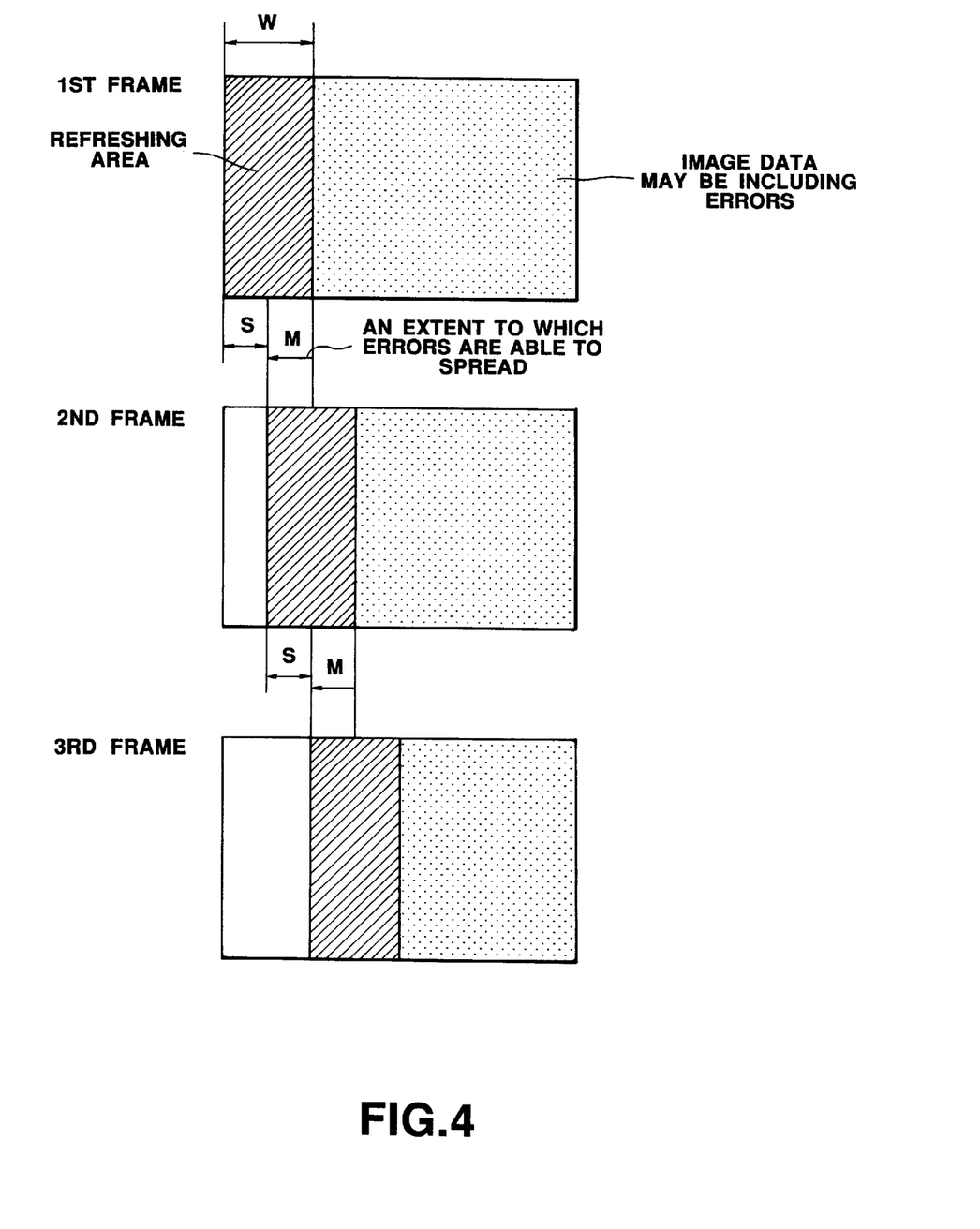
FIG. 4 shows a refresh operation of the encoding device shown in FIG. 1.

When that the refresh area is set in the first frame, as shown in FIG. 4, error data may occur in the area outside the refresh area and, in the second frame, such error data can spread from outside the refresh area in the first frame by an extent corresponding to the maximum motion vector which the motion compensation circuit can compensate.

Supposing that the extent by which the error data can spread, in other words, the extent corresponding to the maximum motion vector which can be compensated, is M, the data W and the data S are ideally set so that following formulas are satisfied:

$$W \geq M+1$$

$$1 \leq S \leq (W-M)$$

The unit used in the above formulas is the distance between adjacent pixels.

In the second frame shown in FIG. 4, the refresh area (where the intra-frame encoding system is performed) is shifted by the distance S. In the case where the data S and the data W meet the above mentioned ideal conditions, the refresh areas in the first and second frames overlap each other by a width (distance) M, as shown in FIG. 4. Therefore, an area in the second frame to which error data can spread from the first frame is definitely refreshed. Accordingly, errors can not spread into an area corresponding to the refresh area of the first frame.

The encoding device which sets the data S, W as above-mentioned ideal conditions, can refresh the whole area without leaving any errors by shifting the refresh area every frame.

The encoding device described above sets the refresh area having a fixed extent in each of the frames. Therefore, the whole area can be refreshed, yet a quantity of data for each frame can be made uniform. Accordingly, the encoding device can avoid frequent deteriorations of images and can prevent bad influences on controlling the buffer.

In above described embodiments, a unit to be processed is supposed one frame of the video signal. However, the present invention can be applied to a encoding device which performs an intra-field encoding system and a inter-field encoding system. Also in this case, the encoding device can embody the same techniques as the above described embodiments. In this specification, "picture" indicates either frame or field.

Values of M, W, S can be set by either a unit of a pixel or a unit of a block. It is desirable that the values are set by quantizing and converting such that the values are easily handled in hardware.

As mentioned above, the encoding device applied to the present invention can avoid frequent deteriorations like flickering of images, can definitely refresh the whole images, and can prevent bad influences on hardware. Therefore the encoding device applied to the present invention can generally improve a quality of encoded images.

What is claimed is:

1. An image encoding device, comprising:
    input means for inputting an image signal of each pixel;
    encoding means for encoding the image signal to compress an amount of information thereof, said encoding means encoding pixels in a first area of a present picture by using only pixels in the present picture, said encoding means being able to encode by motion compensation pixels in a second area of the present picture by using pixels in another picture; and
    changing means for changing the position of the first area at intervals such that the positions of the first areas of adjacent pictures are mutually overlapped, wherein a width of the overlapped area between the first areas of the adjacent pictures is larger than a maximum extent corresponding to the maximum motion vector which can be compensated by the motion compensation in the direction of changing the position of the first area, or equal to the maximum extent.

2. An image encoding device according to claim 1, wherein said changing means maintains an extent of the first area constant.

3. An image encoding device according to claim 1, wherein the first area is repeatedly located at the same position every "n" pictures, "n" being at least two.

4. An image encoding device according to claim 1, wherein said encoding means includes a motion detecting means for detecting a vector of the motion of the image, and said encoding means encodes the image signal by using the vector.

5. An image encoding device according to claim 4, wherein said encoding means further includes a motion compensating means for extracting pixels of another picture to be used for encoding in accordance with the vector.

6. An image encoding device according to claim 1, wherein said encoding means includes an orthogonal transforming circuit for orthogonally transforming the image signal and said encoding means encodes the orthogonally transformed image signal.

7. An image encoding device according to claim 1, wherein said encoding means includes a dividing means for dividing pixels of the image signal into a plurality of blocks each of which is composed of a plurality of pixels, and the first area and the second area are decided by the block as a unit.

8. An image encoding device, comprising:
    input means for inputting an image signal of each pixel;
    encoding means for encoding an image signal to compress an amount of information thereof, said encoding means encoding pixels in a first area of a present picture by using only pixels in the present picture, said encoding means being able to encode by motion compensation pixels in a second area of the present picture by using pixels in another picture; and
    deciding means for deciding the first and second areas such that the positions of the first areas of adjacent pictures are mutually overlapped, wherein a width of the overlapped area between the first areas of the adjacent pictures is larger than a maximum extent corresponding to the maximum motion vector which can be compensated by the motion compensation in the direction of changing the position of the first area, or equal to a maximum extent.

9. An image encoding device according to claim 8, wherein said encoding means includes a motion detecting means for detecting a vector of the motion of the image, and said encoding means encodes the image signal by using the vector.

10. An image encoding device, comprising:
    first encoding means for encoding a subset of pixels of a present picture by using only pixels in the present picture, positions of the subset of pixels being changed at intervals such that the positions of the subset are mutually overlapped in adjacent pictures;
    motion detecting means for detecting a motion of the image and generating a motion vector; and
    second encoding means for encoding outside the subset, by using pixels in another picture, in accordance with an output of said motion detecting means, wherein a width of the overlapped area is larger than a maximum extent corresponding to the largest motion vector which said motion detecting means can detect in the direction of changing the position of the subset, or equal to the maximum extent.

11. A method of encoding an image, comprising the steps of:
    inputting an image signal of each pixel;
    encoding the image signal to compress an amount of information thereof, said encoding step encoding pixels in a first area of a present picture by using only pixels in the present picture, said encoding step being able to encode by motion compensation pixels in a second area of the present picture by using pixels in another picture; and changing the position of the first area at intervals such that the positions of the first areas of adjacent pictures are mutually overlapped, wherein a width of the overlapped area between the first areas of the adjacent pictures is larger than a maximum extent corresponding to the maximum motion vector which can be compensated by the motion compensation in the direction of changing the position of the first area, or equal to the maximum extent.

12. A method of encoding an image, comprising the steps of:

inputting an image signal of each pixel;

encoding an image signal to compress an amount of information thereof, said encoding step encoding pixels in a first area of a present picture by using only pixels in the present picture, said encoding step being able to encode by motion compensation pixels in a second area of the present picture by using pixels in another picture; and deciding the first and second areas such that the positions of the first areas of adjacent pictures are mutually overlapped, wherein a width of the overlapped area between the first areas of the adjacent pictures is larger than a maximum extent corresponding to the maximum motion vector which can be compensated by the motion compensation in the direction of changing the position of the first area, equal to the maximum extent.

13. A method of encoding an image, comprising the steps of:

encoding a subset of pixels of a present picture by using only pixels in the present picture, positions of the subset of pixels being changed at intervals such that the positions of the subset are mutually overlapped in adjacent pictures;

detecting a motion vector of the image; and encoding pixels outside the subset, by using pixels in another picture, in accordance with an output of said motion detecting step, wherein a width of the overlapped area is larger than a maximum extent corresponding to a magnitude of the largest motion vector which is able to be detected by said motion detecting step in the direction of changing the position of the subset, or equal to the maximum extent.

14. An image encoding device, comprising:

encoding means for encoding an image signal, said encoding means intra-picture encoding the image signal in a first area of a present picture and inter-picture encoding by motion compensation the image signal in a second area of the present picture; and deciding means for deciding the first and second area such that the positions of the first areas of adjacent pictures are mutually overlapped, wherein a width of the overlapped area between the first areas of the adjacent pictures is larger than a maximum extent corresponding to the maximum motion vector which can be compensated by the motion compensation in the direction of changing the position of the first area, or equal to the maximum extent.

15. An image encoding device according to claim 10, wherein said second encoding means encodes pixels outside the subset by using the motion vector.

16. A device according to claim 14, wherein said encoding means includes motion detecting means for detecting a vector of the motion of the image, and wherein said encoding means encodes the image signal by using said vector.

17. A device according to claim 16, wherein said encoding means further includes motion compensating means for extracting pixels of another picture to be used for encoding in accordance with said vector.

18. A device according to claim 14, wherein said encoding means includes an orthogonal transforming circuit for orthogonally transforming the image signal, and wherein said encoding means encodes the orthogonally-transformed image signal.

19. A device according to claim 14, wherein said encoding means includes dividing means for dividing the image signal into a plurality of blocks each of which comprises a plurality of pixels, and wherein said deciding means decides said first area and said second area by a unit of a block.

20. An image encoding device, comprising:

encoding means for encoding an image signal, said encoding means intra-picture encoding the image signal in a first area of a present picture and inter-picture encoding, by motion compensation, the image signal in a second area of the present picture; and changing means for changing the position of the first area at intervals such that the positions of the first areas of adjacent pictures are mutually-overlapped, a width of the overlapped area between the first areas of the adjacent pictures being larger than a maximum extent corresponding to the maximum motion vector which can be compensated by the motion compensation in the direction of changing the position of the first area, or equal to the maximum extent.

21. An image encoding method comprising the steps of:

the step of encoding an image signal, said encoding step intra-picture encoding the image signal in a first area of a present picture and inter-picture encoding, by motion compensation, the image signal in a second area of the present picture; and a step of deciding the first and second areas such that the positions of the first areas of adjacent pictures are mutually-overlapped, a width of the overlapped area between the first areas of the adjacent pictures being larger than a maximum extent corresponding to the maximum motion vector which can be compensated by the motion compensation in the direction of changing the position of the first area, or equal to the maximum extent.

22. An image encoding method comprising the steps of:

a step of encoding an image signal, said encoding step intra-picture encoding the image signal in a first area of a present picture and inter-picture encoding, by motion compensation, the image signal in a second area of the present picture;

a step of changing the position of the first area at intervals such that the positions of first areas of adjacent pictures are mutually overlapped, a width of the overlapped area between the first areas of adjacent pictures being larger than a maximum extent corresponding to the maximum motion vector which can be compensated by the motion compensation in the direction of changing the position of the first areas, or equal to the maximum extent.

* * * * *

UNITED STATES PATENT AND TRADEMARK OFFICE
CERTIFICATE OF CORRECTION

PATENT NO. : 5,825,931

DATED : October 20, 1998

INVENTOR(S) : MITSURU OWADA, ET AL.          Page 1 of 2

It is certified that error appears in the above-identified patent and that said Letters Patent is hereby corrected as shown below:

<u>COVER PAGE [57] ABSTRACT</u>,
Line 6, "to" should read --the spread of--; and
Line 7, "spread" should be deleted.

<u>COLUMN 1</u>,
Line 18, "an" should be deleted;
Line 19, "a inter-" should read --inter- --; and
Line 55, "using a" should read --using an--.

<u>COLUMN 2</u>,
Line 12, "In" should read --¶ In--.

<u>COLUMN 5</u>,
Line 10, "orthogonally" should read --orthogonal--; and
Line 46, "compare" should read --compares--.

<u>COLUMN 7</u>,
Line 23, "one" should read --to be one--;
Line 24, "a" should read --an--;

UNITED STATES PATENT AND TRADEMARK OFFICE
CERTIFICATE OF CORRECTION

PATENT NO. : 5,825,931

DATED : October 20, 1998

INVENTOR(S) : MITSURU OWADA, ET AL.

It is certified that error appears in the above-identified patent and that said Letters Patent is hereby corrected as shown below:

COLUMN 7 (Cont.),
Line 25, "a" should read --an--.

Signed and Sealed this

Eighth Day of June, 1999

Attest:

Q. TODD DICKINSON

*Attesting Officer*    *Acting Commissioner of Patents and Trademarks*